March 19, 1929.  G. E. RANDLES  1,705,499
DRILLING MACHINE
Filed March 5, 1925   3 Sheets-Sheet 2
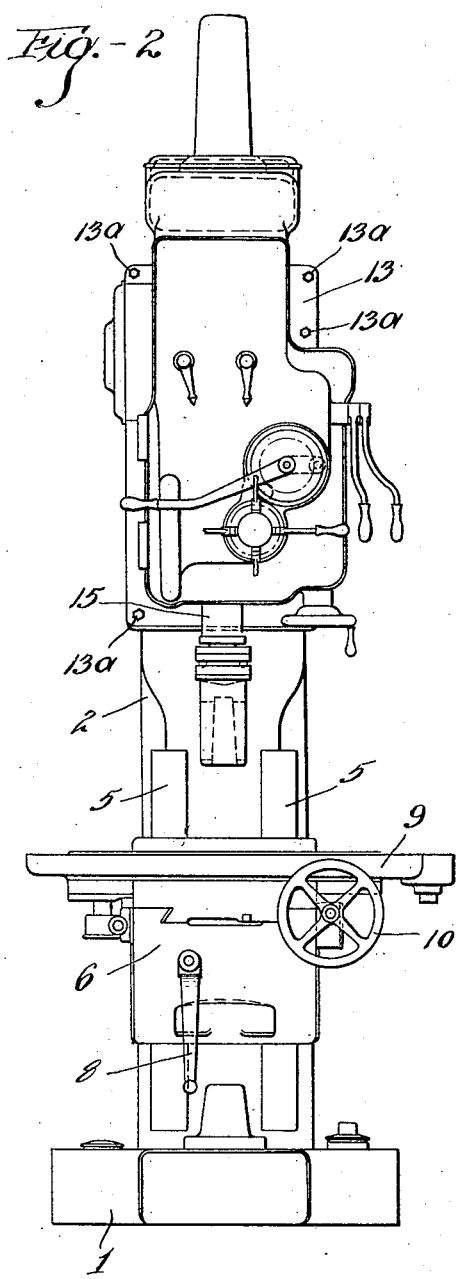
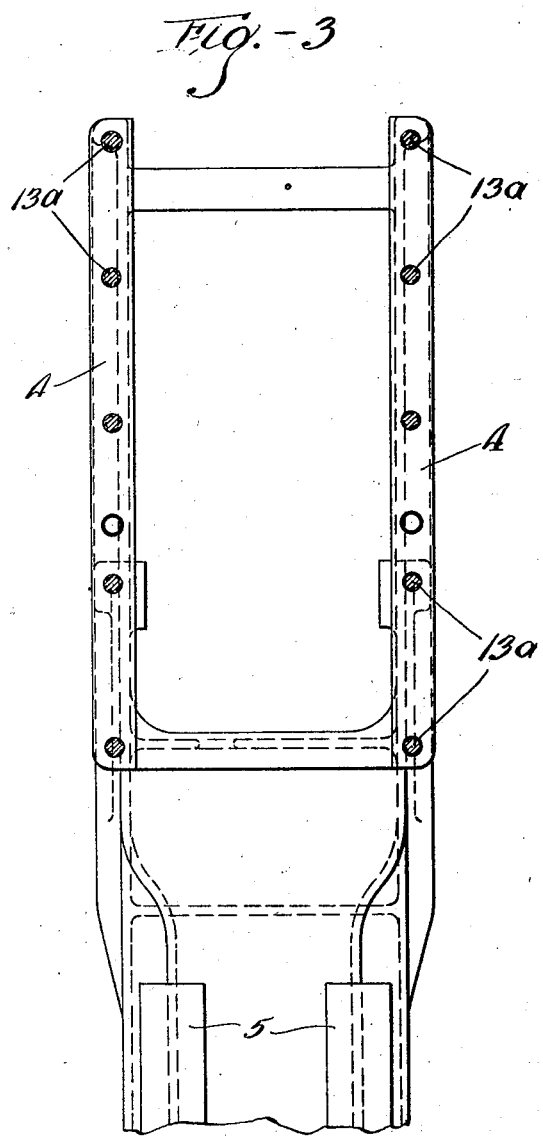
Inventor
George E. Randles
By Brockett, Hyde & Milburn
Attorneys

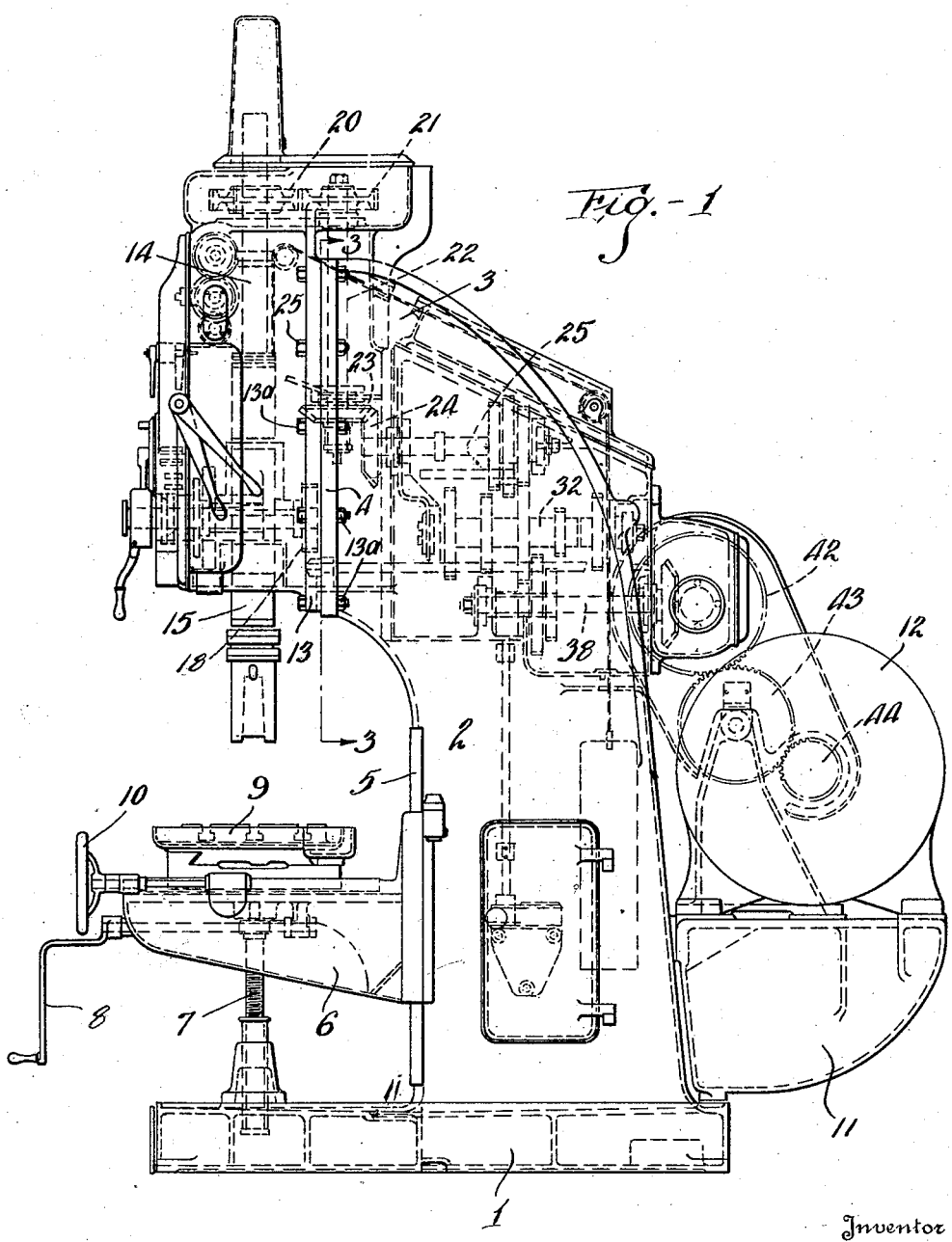

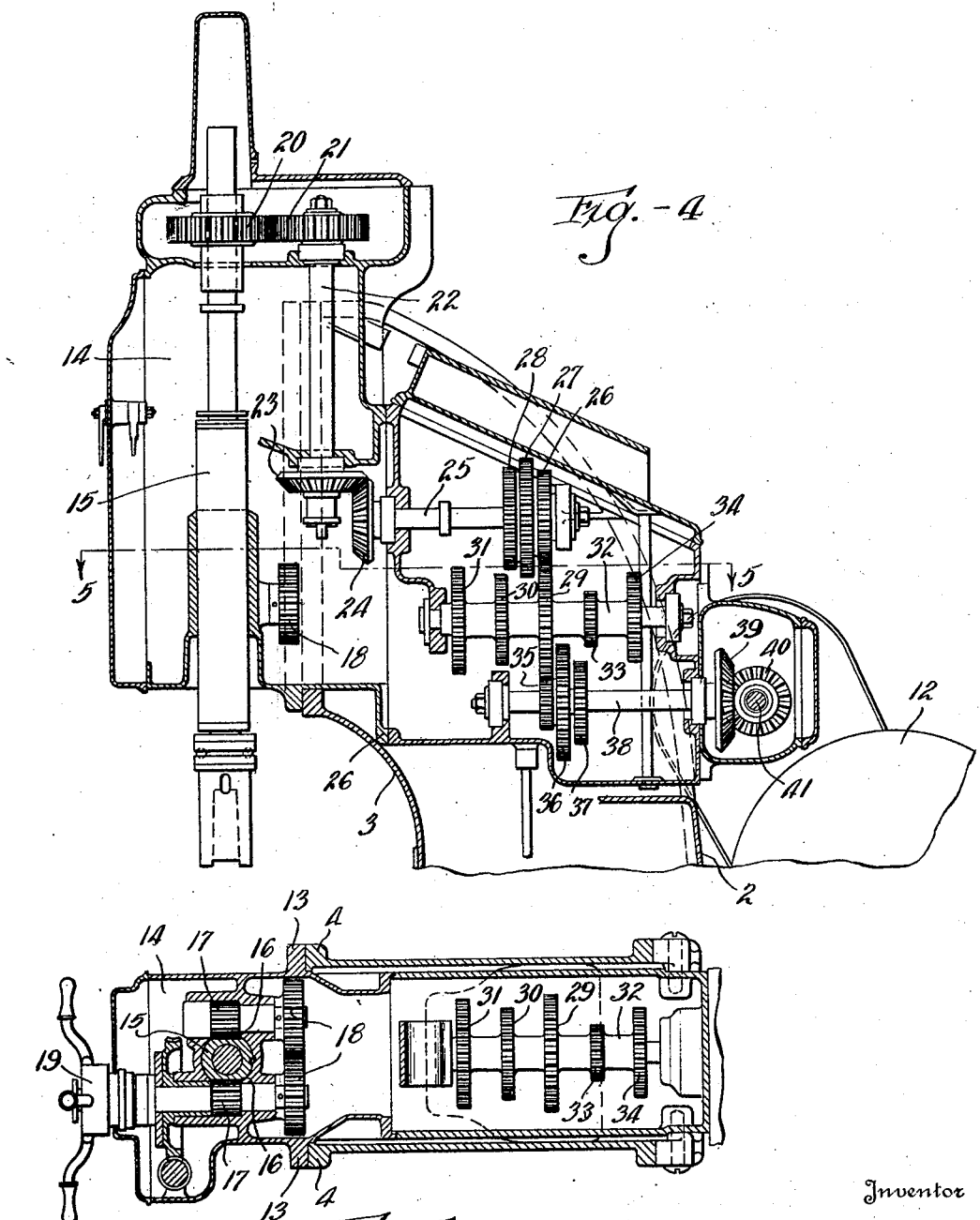

Patented Mar. 19, 1929.

1,705,499

UNITED STATES PATENT OFFICE.

GEORGE E. RANDLES, OF CLEVELAND, OHIO, ASSIGNOR TO THE FOOTE-BURT COMPANY, OF CLEVELAND, OHIO, A CORPORATION OF OHIO.

DRILLING MACHINE.

Application filed March 5, 1925. Serial No. 13,263.

This invention relates to drill presses and more particularly, to drill presses of the type including a C-shaped frame structure with the bed or work support and the spindle head opposed at the frame opening.

In drill presses of this type especially designed for heavy or high speed duty and particularly in the larger units, it has been customary to form the C-shaped frame structure of a lower part comprising the bed or work support and an upwardly extending rear portion having a horizontally disposed, finished flange surface for engagement with and attachment to the horizontal flange surface of an upper frame part which extends upwardly and forwardly over the bed or work support. In other words, the C-shaped frame structure is parted on a horizontal plane, usually located slightly above the bed or work support. The bolts which secure together the flange surfaces of the upper and lower frame parts are obviously under considerable tension, particularly during use of the drill press and any lost motion or give at this junction point not only results in inaccurate work, but also increases the burden or duty imposed upon the spindle head structure itself and the spindle driving mechanism. For example, if a drill spindle boring a large hole under heavy duty is thrown merely at a slight angle to the vertical, said spindle will be cramped in said hole, with the result that the hole is improperly drilled and additional resistance to the spindle and undesirable wear upon the spindle bearing and other parts are produced.

The present invention aims to overcome the foregoing and other disadvantages by having the spindle head structure formed as a unit and secured to the upper end portion of the C-shaped unitary portion of the frame along a vertical plane. This vertical plane of securement should be as near the plane of the spindle axis as is possible, and in the specific embodiment here illustrated is slightly to the rear, an arrangement enabling all practical advantages to be obtained. The bolts securing together the flanges of the spindle head structure and the C-shaped frame are under but slight tension, performing practically all their duty in shear so that the thrust of the drill spindle in performing its work is substantially along the plane of the attached flanged faces. Very slight leverage is brought to bear upon the spindle head to pry it, as it were, away from the frame.

It has been found in practice and actual tests that a drill press constructed along these lines is extremely efficient and may be subjected to maximum duty with an extremely efficient performance as compared with drill presses of like capacity where the frame structure is divided along a horizontal frame, at right angles to the spindle axis.

Further details of the invention will be apparent from the following description, drawings and claims.

Referring to the drawings, Fig. 1 is a side elevation of a drill press embodying the present invention; Fig. 2 is a front elevation thereof; Fig. 3 is a front elevation of the upper portion of the frame on the line 3—3, Fig. 1; Fig. 4 is an enlarged sectional view of the spindle head structure; and Fig. 5 is a cross sectional view on the line 5—5, Fig. 4.

The drill press illustrated in the drawings comprises a suitable base 1 provided with an upwardly extending column or standard 2 preferably formed integral therewith. This standard is provided with an integrally formed upper, forwardly curved portion 3 terminating in an upwardly opening U-shaped portion having front, vertically disposed flanges 4, as clearly shown in Fig. 3. This U-shaped frame portion is open to receive the latter described spindle head structure as will later appear.

The standard 2 of the frame is also provided with sutable ways 5 for guiding the bed or work support 6 which is supported upon and given vertical movement by an elevating screw jack 7 operated by a suitable handle 8. The work support may be of any suitable type and may be provided with a work table 9 and with suitable feeding devices operated by a hand wheel 10. A bracket 11 extends rearwardly from the rear of the standard 2 and upon this bracket is mounted a suitable electric motor 12 for driving the drill spindle.

The spindle head structure may be of any suitable type, so long as it will fit into the opening of the U-shaped upper frame portion and is provided with a vertically disposed flange 13 for engagment with and attachment to the flanges 4 of the frame. The spindle head structure here shown includes a main spindle housing 14 having suitable bearings for supporting and guiding the main drill spindle 15. The frame flanges 4 and spindle head flanges 13 are secured together by bolts 13ª which are under but slight tension, performing practically all their duty in shear. The thrust of the drilling operation will be transmitted upwardly to the drill spindle housing, the bolts 13ª and the C-shaped frame. There is, therefore, practically no lost motion or give present in the frame to be reflected in any way in the operation of the drill.

While the particular form of the mechanism for giving the drill spindle its vertical feeding motion and its rotary work producing motion is largely immaterial, the following mechanism is here illustrated for this purpose.

As indicated in Fig. 5, the drill spindle 15 is provided upon opposite sides with rack teeth 16 for co-operation with pinions 17 driven by gears 18 which in turn are driven by the hand wheel 19 at the front of the frame. Loosely splined upon the upper end portion of the spindle is a gear 20 meshing with and driven by a gear 21 mounted upon a vertically disposed shaft 22 having a bevel gear 23 secured upon its lower end portion. This bevel gear meshes with a bevel gear 24 mounted upon a horizontally disposed transmission shaft 25, said shaft being also provided with a slidable compound gear comprising gears 26, 27 and 28. The three gears of this compound gear are respectively adapted for meshing engagement with gears 29, 30 and 31 mounted upon a second horizontally disposed transmission shaft 32, said shaft being also provided with gears 33 and 34. Gears 29, 33 and 34 of shaft 32 are adapted for respective meshing engagement with gears 35, 36 and 37 forming a compound gear which is slidably mounted upon a horizontally disposed drive shaft 38. This drive shaft is provided at one end with a bevel gear 39 meshing with a bevel gear 40 on a shaft 41 which in turn is driven through gears 42 and 43 by the pinion 44 on the shaft of the motor 12.

It will be noted that by the arrangement described it is possible to pre-assemble the spindle head structure, including the spindle and the speed change gears together with their immediate supporting parts, as a unit, before assembling the whole into the C-shaped frame; which arrangement permits of the well-known advantages of fitting most of the working parts on the bench.

It will also be noted that the flange 13 lies in a plane generally midway of the unitary spindle head structure so that the weight of this structure is substantially balanced fore and aft of the flanges 4 of the frame.

Having thus described my invention, I claim:

1. A drill press, comprising a frame including a column portion provided at its upper end with side walls separated by a through cavity and terminating in edge portions presenting forwardly a pair of securing faces, and a self-contained drilling unit including a sub-frame, a spindle sleeve axially movable in one end thereof, a spindle journalled in the sleeve, a driving shaft journalled in the sub-frame for connection with a prime mover at the end of said sub-frame opposite said spindle, and change speed gearing for driving said spindle from said shaft, said unit being insertable into said cavity between said side walls to a position where the drill spindle is forward of the front securing faces thereof and where the change speed gearing is between said walls and where said connection may be had rearward thereof, and the sub-frame being provided with means adapted for securement to said securing faces when the unit is so positioned, whereby said unit may be assembled before being secured with said frame to complete the press ready for connection with a prime mover.

2. A drill press, comprising a frame including a column portion provided at its upper end with side walls separated by a through cavity and terminating in edge portions presenting forwardly a pair of securing faces, and a self-contained drilling unit including a sub-frame, a drill spindle and change speed mechanism supported therein, said unit being insertable into said cavity between said parallel walls to a position where the drill spindle is forward of the front securing faces thereof and where driving connection with a prime mover may be had rearward of said walls, the sub-frame being provided with means adapted for securement to said securing faces, when the parts are so positioned, whereby said unit may be assembled before being secured with said frame to complete the press ready for connection with a prime mover, and the securing means of the sub-frame being located approximately midway of the unit so that when attached the weight of the unit is distributed on both sides of the attachment to the main frame.

3. A drill press, comprising a frame including a column portion provided at its upper end with side walls separated by a through cavity and terminating in vertical edge portions presenting forwardly a pair of securing faces, and a self-contained drilling unit including a sub-frame, a spindle sleeve axially movable in one end thereof, a spindle journalled in the sleeve, a vertically disposed shaft adjacent the spindle, a driving shaft journalled in the frame for connection with a prime mover at the end of the frame opposite said spindle, change speed gearing for driving said spindle from said shaft, feed mechanism for the sleeve operatively connected with the shaft, said unit being positioned in said cavity with said vertically disposed shaft and said gearing between said side walls, with said spindle forward thereof, and with said driving shaft connectable with a prime mover rearward of said walls, whereby said unit may be assembled before being secured with said frame to complete the press ready for connection with a prime mover.

In testimony whereof I hereby affix my signature.

GEORGE E. RANDLES.